(12) United States Patent
Kobayashi et al.

(10) Patent No.: US 6,219,223 B1
(45) Date of Patent: Apr. 17, 2001

(54) SOLID ELECTROLYTE CAPACITOR AND METHOD OF PRODUCING THE SAME

(75) Inventors: Atsushi Kobayashi, Tokyo; Kenji Araki; Takashi Fukaumi, both of Toyama, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/159,586

(22) Filed: Sep. 24, 1998

(30) Foreign Application Priority Data

Sep. 24, 1997 (JP) .................................................. 9-258595

(51) Int. Cl.$^7$ ................................. H01G 9/02; H01G 9/15
(52) U.S. Cl. ..................... 361/525; 361/528; 29/25.03; 252/62.2
(58) Field of Search ........................... 361/523, 525, 361/532, 528–529, 527; 29/25.03; 252/62.2

(56) References Cited

U.S. PATENT DOCUMENTS

| 4,910,645 | 3/1990 | Jonas et al. ............................ 361/525 |
| 5,812,367 | * | 9/1998 | Kudoh et al. .......................... 361/523 |

FOREIGN PATENT DOCUMENTS

| 2-15611 | 1/1990 | (JP) . |
| 8-45790 | 2/1996 | (JP) . |
| 10-32145 | 2/1998 | (JP) . |

* cited by examiner

*Primary Examiner*—Anthony Dinkins
(74) *Attorney, Agent, or Firm*—Sughrue, Mion, Zinn, Macpeak & Seas, PLLC

(57) ABSTRACT

In a solid electrolyte capacitor including a solid electrolyte implemented by a conducting polymer produced by the chemical oxidative polymerization of a polymerization system containing a monomer, a cation serving as an oxidizer, and an anion serving as a dopant, the polymerization system contains the anion in a stoichiometrically excessive amount relative to the cation. The conductivity of a conducting polymer included in the capacitor is prevented from being deteriorated in a high temperature atmosphere, so that a desirable ESR is preserved during 125° C. heat test. In addition, a conductive high polymer layer having an extremely desirable film property is formed. This successfully prevents stresses ascribable to the expansion and contraction of a seal resin from being transferred to the capacitor during heat test, and thereby protects LC and ESR from deterioration.

13 Claims, 4 Drawing Sheets

Fig. 3

| | OXIDIZER/ DOPANT MOLAR RATIO | ESR BEFORE TEST | ESR AFTER TEST (IN 1,000 HOURS) |
|---|---|---|---|
| EXAMPLE 1 | 1/3.3 | 156mΩ | 156mΩ |
| EXAMPLE 2 | 1/3.3 | 154mΩ | 155mΩ |
| EXAMPLE 3 | 1/1.66 | 155mΩ | 155mΩ |
| EXAMPLE 4 | 1/3.3 | 157mΩ | 158mΩ |
| EXAMPLE 5 | 1/3.3 | 153mΩ | 155mΩ |
| COMPARATIVE EXAMPLE 1 | 1/3.0 | 155mΩ | 2,530mΩ |
| EXAMPLE 6 | 1/3.3 | 83mΩ | 87mΩ |
| EXAMPLE 7 | 1/3.3 | 82mΩ | 84mΩ |
| EXAMPLE 8 | 1/1.66 | 84mΩ | 86mΩ |
| EXAMPLE 9 | 1/3.3 | 83mΩ | 84mΩ |
| EXAMPLE 10 | 1/3.3 | 82mΩ | 84mΩ |
| COMPARATIVE EXAMPLE 2 | 1/3.0 | 84mΩ | 453mΩ |

Fig. 4

| | OXIDIZER/ DOPANT MOLAR RATIO | LC & ESR BEFORE TEST | LC & ESR AFTER TEST |
|---|---|---|---|
| EXAMPLE 1 | 1/3.3 | 27nA 156mΩ | 26nA 156mΩ |
| EXAMPLE 2 | 1/3.3 | 23nA 154mΩ | 23nA 155mΩ |
| EXAMPLE 3 | 1/1.66 | 25nA 155mΩ | 26nA 158mΩ |
| EXAMPLE 4 | 1/3.3 | 22nA 157mΩ | 24nA 156mΩ |
| EXAMPLE 5 | 1/3.3 | 28nA 153mΩ | 26nA 155mΩ |
| COMPARATIVE EXAMPLE 1 | 1/3.0 | 26nA 155mΩ | 2,350nA 325mΩ |
| EXAMPLE 6 | 1/3.3 | 24nA 83mΩ | 23nA 85mΩ |
| EXAMPLE 7 | 1/3.3 | 24nA 82mΩ | 25nA 84mΩ |
| EXAMPLE 8 | 1/1.66 | 27nA 84mΩ | 27nA 85mΩ |
| EXAMPLE 9 | 1/3.3 | 25nA 83mΩ | 27nA 83mΩ |
| EXAMPLE 10 | 1/3.3 | 22nA 82mΩ | 21nA 83mΩ |
| COMPARATIVE EXAMPLE 2 | 1/3.0 | 26nA 84mΩ | 4,530nA 154mΩ | ated polymer by an oxidizer. Further, leak current and
SOLID ELECTROLYTE CAPACITOR AND METHOD OF PRODUCING THE SAME

BACKGROUND OF THE INVENTION

The present invention relates to a solid electrolyte capacitor using a conducting polymer as a solid electrolyte, and a method of producing the same.

Generally, a solid electrolyte capacitor has a first electrode (anode), a dielectric implemented by an oxide film formed on the first electrode, and a second electrode (cathode) partly implemented by a solid electrolyte formed on the dielectric. The first electrode is constituted by a porous body of valve metal, e.g., tantalum, niobium or aluminum. The solid electrolyte electrically connects the entire dielectric and electrode leads. Therefore, the conductivity of the solid electrolyte should preferably be as high as possible so as to reduce the resistance of the capacitor itself. On the other hand, the solid electrolyte is required to automatically heal electric short-circuiting ascribable to the defects of the dielectric film. For this reason, metal lacking a dielectric healing function cannot be used as a solid electrolyte although it may have a high conductivity. The solid electrolyte has customarily been implemented by, e.g., manganese dioxide or 7, 7', 8, 8'-tetracyanoquinodimethane complex (TCNQ complex) which migrates to an insulator due to heat generated by short-circuit current. Particularly, manganese dioxide resistive to temperature at least above 240° C. is predominant because the solid electrolyte is exposed to temperature between 240° C. and 260° C. when the capacitor is mounted to a printed circuit board.

As stated above, a substance to implement the solid electrolyte of a solid electrolyte capacitor must satisfy a condition that it has a high conductivity, a condition that it has a dielectric repairing function, and a condition that it is resistive to healing above 240° C.

While manganese dioxide customarily used as a solid electrolyte is satisfactory as to the dielectric healing function and heat resistance, its conductivity (about 0.1 S/cm) is not sufficient. In light of this, electrolyte capacitors using polypyrrole, polythiophene, polyaniline and other conductive high polymers satisfying the above three conditions as a solid electrolyte are under development. Capacitors using polypyrrole have already been put on the market.

Generally, a capacitor using a conducting polymer has four different problems to be solved, as follows. First, the conducting polymer must be formed over the entire surface of the inside of a porous body. Second, the conductivity of the polymer must not decrease in a high temperature atmosphere to which the capacitor is exposed. Third, a conducting polymer layer must be formed on an oxide film with a thickness great enough to withstand stresses ascribable to the expansion and contraction of a seal resin. Fourth, The conducting polymer layer must be easy to form for reducing the production cost of the capacitor.

To solve the above problems, polymerizing a thiophene derivative with a ferric compound has been proposed in order to use the resulting polymer as a solid electrolyte, as taught in, e.g., Japanese Patent Laid-Open Publication No. 2-15611 and U.S. Pat. No. 4,910,645. The above polymer is resistive to heat more than the polymer of a pyrrole derivative and therefore desirable to solve the second problem.

Japanese Patent Application No. 8-185831 discloses a solid electrolyte capacitor including a solid electrolyte layer implemented by a polymer layer doped with an organic sulfonic acid having a large molecule size, and a method of producing a solid state capacitor which forms a polymer layer by use of a ferric compound, a silver compound or similar compound as an oxidizer.

However, the method taught in the above Laid-Open Publication No. 2-15611 has some problems left unsolved, as follows. In a 125° C., 150° C. or similar high temperature atmosphere, conductivity decreases due to dedoping because the amount of dopant is locally short relative to a conducting polymer produced by an oxidizer. Further, leak current and ESR (Equivalent Serial Resistance) noticeably increase during solder heat test and thermal shock test. An increase in leak current stems from the fact that the thickness of the conducting polymer layer is locally short and cannot absorb mechanical stresses, causing the stresses to directly act on a capacitor device. An increase in ESR is ascribable to the fact that separation occurs within the conducting polymer layer due to mechanical stresses.

Technologies relating to the present invention are also taught in, e.g., Japanese Patent Laid-Open Publication No. 8-45790.

SUMMARY OF THE INVENTION

It is therefore an object of the present invention to provide a solid electrolyte capacitor including a solid electrolyte layer in the form of a conducting polymer layer highly resistive to heat and mechanical stresses, and a method of producing the same.

In accordance with the present invention, in a solid electrolyte capacitor including a solid electrolyte constituted by a conductive high polymer produced by the chemical oxidative polymerization of a polymerization system containing a monomer, a cation serving as an oxidizer, and an anion serving as a dopant, the polymerization system contains the anion in a stoichiometrically excessive amount relative to the cation.

Also, in accordance with the present invention, in a method of producing a solid electrolyte capacitor and including a step of forming, as a solid electrolyte, a conducting polymer layer on a dielectric layer present on a surface of an anode by the chemical oxidative polymerization of a polymerization system containing a monomer, a cation serving as an oxidizer, and an anion serving as a dopant, the polymerization system contains the anion in a stoichiometrically excessive amount relative to the cation.

BRIEF DESCRIPTION OF THE DRAWINGS

The above and other objects, features and advantages of the present invention will become apparent from the following detailed description taken with the accompanying drawings in which:

FIG. 3 is a table listing ESRs measured with Examples 1–10 of the present invention and Comparative Examples 1 and 2 before and after 125° C. heat tests; and FIG. 4 lists LCs and ESRs measured with Examples 1–10 and Comparative Examples 1 and 2 before and after thermal shock tests.

DESCRIPTION OF THE PREFERRED EMBODIMENT

Figure 1A:
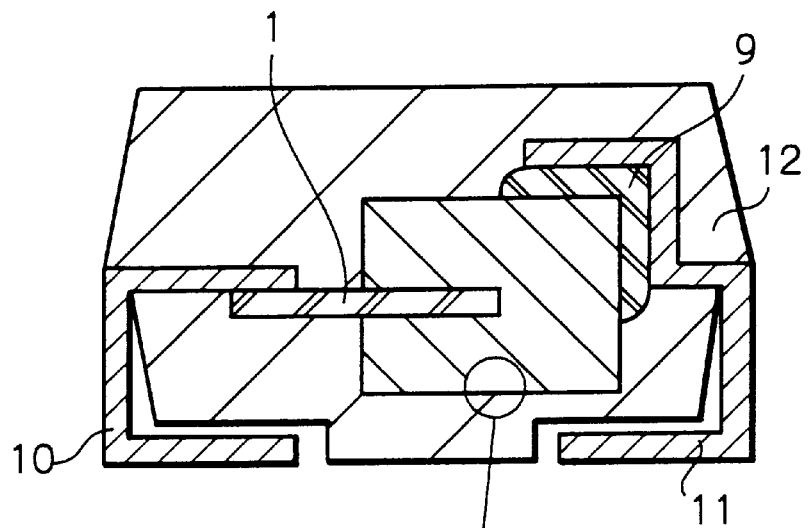
FIG. 1A is a section showing a solid electrolyte capacitor embodying the present invention.

Any desired monomer is applicable to the present invention so long as it is capable of producing a conducting polymer. Preferably, the monomer should be pyrrole, thiophene, furan or aniline or a derivative thereof. Two or more monomers may be used in combination, if desired.

For a cation playing the role of an oxidizer, use may be made of any one of conventional cations having an oxidizing function, e.g., ferric ions, cupric ions or silver ions. Among them, ferric ions or cupric ions are preferable from the productivity standpoint because they enhance yield as to the polymerization of a conductive high polymer.

Also, for an anion serving as a dopant, any conventional anion is usable. Particularly, the ions of aromatic sulfonic acids, aromatic polysulfonic acids, organic sulfonic acids including a hydroxy group, organic sulfonic acids including a carboxyl group, alycyclic sulfonic acids, benzoquinone sulfonic acids and other organic sulfonic acids can effectively stabilize the conductivity of a conducting polymer layer because their molecule sizes are large enough to obstruct easy dedoping in a high temperature atmosphere. Examples of such organic sulfonic acids are dodecylbenzene sulfonic acid, toluene sulfonic acid, benzil sulfonic acid, naphthalene sulfonic acid, phenol sulfonic acid, sulfoisofuthalic acid, sulfosalicylic acid, kampher sulfonic acid, and adamantane sulfonic acid.

The prerequisite with the present invention is that the anion playing the role of a dopant be contained in the polymerization system in a stoichiometrically excessive amount relative to the cation playing the role of an oxidizer. Although the stoichiometric excess ratio is open to choice, it should preferably be between 2% to 20% in order to enhance the advantages of the present invention.

The cation and anion may be introduced into a polymerization system as a compound, in which case a compound containing an excess anion will be added later. Alternatively, the cation and the anion stoichiometrically excess in amount may be introduced into a polymerization system independently of each other as a compound containing a cation and a compound containing an anion, respectively.

The solid electrolyte capacitor of the present invention is produced by the following procedure. First, when the valve metal is implemented by aluminum foil, a number of fine holes are formed in the surface of the foil by etching. When use is made of niobium powder for the valve metal, the powder is pressed and sintered to form a porous sintered body. The aluminum foil or the sintered body undergone such processing serves as an anode. Subsequently, the valve metal is subjected to anodic oxidation in order to form an oxide film of dielectric on its surface. Then, a conducting polymer or solid electrolyte is formed on the surface of the oxide film by chemical oxidative polymerization using a polymerization system containing a monomer, a cation or oxidizer, and an anion or dopant. Thereafter, the laminate is coated with a carbon paste and a silver paste and then sintered. Finally, an outside lead and a cathode lead are connected to the sintered laminate, and then the entire laminate is sealed to turn out a product.

For the above chemical oxidative polymerization, use may be made of any one of conventional procedures including the following procedures (1)–(4). In the procedure (1), after a mixture solution of a monomer cooled to its reaction start temperature, a cation (oxidizer) and an anion (dopant) has been introduced into the porous body of valve metal formed with the oxide film, the entire system is left in an atmosphere of temperature high than the reaction start temperature in order to cause chemical oxidative polymerization to occur. In the procedure (2), a mixture solution of a polymer of conducting polymer, an oxidizer and a dopant is applied and then dried. In the procedure (3), a mixture solution of an oxidizer and a dopant is introduced into, either directly or after being dissolved in a suitable solvent, the porous body of valve metal formed with the oxide film, and then the entire system is caused to contact a monomer of conducting polymer or a solution or a gas thereof in order to cause chemical oxidative polymerization to occur. In the procedure (4), after a monomer of conducting polymer has been introduced into the porous body of valve metal, the entire system is caused to contact a mixture solution of an oxidizer and a dopant.

The solid electrolyte capacitor and the method of producing the same of the present invention will be described more specifically hereinafter with reference to the accompanying drawings.

Figure 1B:
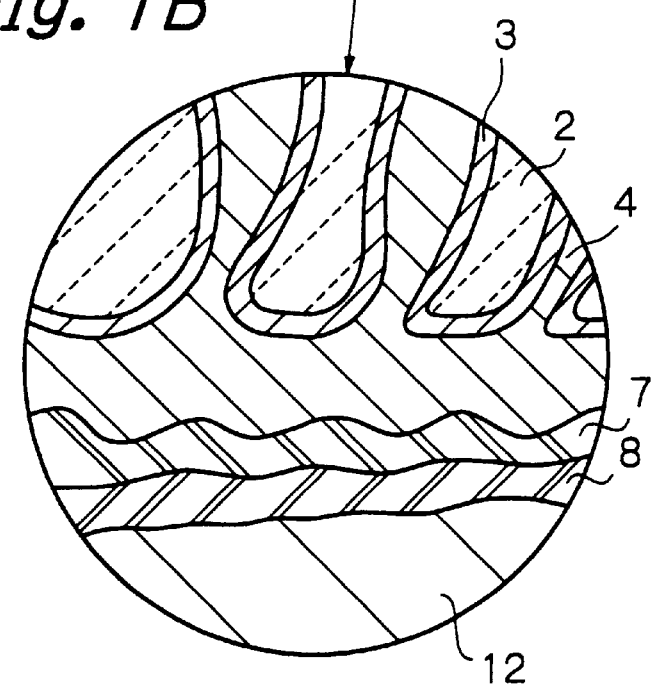
FIG. 1B is a fragmentary enlarged view of the capacitor shown in FIG. 1A.

FIGS. 1A and 1B show a specific configuration of a solid electrolyte capacitor embodying the present invention. As shown, the capacitor includes a sintered pellet of valve metal 2 constituting an anode. An oxide film or dielectric 3 is formed on the surface of the pellet 2 by anodic oxidization. A conducting polymer layer or solid electrolyte layer 4 is formed on the dielectric 3. There are also shown in FIGS. 1A and 1B an anode wire 1, an anode terminal 10, a cathode terminal 11, conductive adhesive 9 adhering the cathode and cathode terminal, an epoxy resin 12 sealing the capacitor, a carbon paste layer 7, and a silver paste layer 8.

Figure 2:
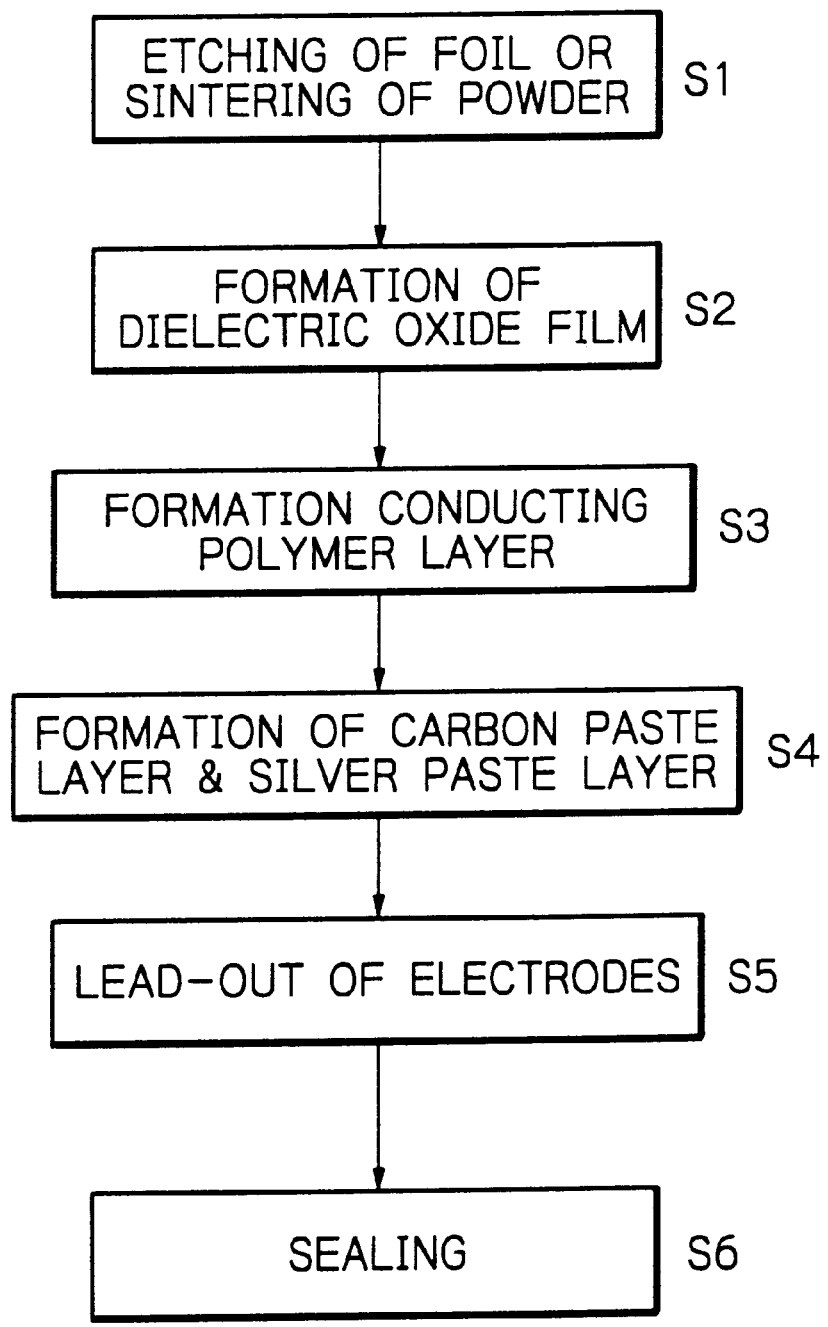
FIG. 2 is a flowchart demonstrating a specific procedure for producing the capacitor of FIGS. 1A and 1B.

A procedure for producing the capacitor of the present invention will be described with reference to FIG. 2. As shown, a porous sintered body is formed by etching aluminum foil or sintering tantalum powder or niobium powder (step S1). The etched aluminum foil or the sintered body is subjected to anodic oxidation in order to form a dielectric oxide film on its surface (step S2). Then, a conducting polymer layer or solid electrolyte is formed on the dielectric by chemical oxidative polymerization using a polymerization system containing a monomer, an oxidizer, and a stoichiometrically excessive amount of dopant (step S3). Subsequently, a carbon paste layer and a silver paste layer are sequentially formed on the conducting polymer layer, completing a capacitor device. After an anode lead and a cathode lead have been led out (step S5), the entire laminate is sealed with, e.g., an epoxy resin to thereby complete a solid electrolyte capacitor (step S6).

Specific examples of the present invention are as follows.

EXAMPLE 1

A 1 mm long, 1 mm wide and 1 mm high, rectangular parallelepiped tantalum sintered pellet 2 (voidage of about 60% was subjected to anodic oxidation in 0.05% nitric acid at 20 V. As a result a tantalum oxide film 3 playing the role of a dielectric was formed on the surface of the pellet 2. The pellet 2 had a capacitance of 12.2 $\mu$F (120 Hz), as measured in the nitric acid. 4 g of dodecylbenzene sulfonic acid was added to 100 g of methanol solution containing 7% of pyrrole and 38% of ferric dodecylbenzene sulfonic acid, and the mixture solution was cooled to −70° C. The sintered pellet 2 was immersed in the cooled mixture solution. Ferric ions ($Fe^{3+}$) and dodecylbenzene sulfonic acid ions ($DBS^-$) serving as an oxidizer and a dopant, respectively, had a molar ratio of 1:3.3 (dodecylbenzene sulfonic acid was excessive with respect to a stoichiometric ratio of 1:3). The pellet 2 was left at room temperature for 30 minutes, rinsed with methanol for 15 minutes, and then dried for 30 minutes in a 150° C. constant temperature vessel to thereby form a polypyrrole layer. These steps were repeated 10 consecutive times in order to form a conducting polymer layer 4 formed of polypyrrole doped with dodecylbenzene sulfonic acid. At this instant, dodecylbenzene sulfonic acid was added such that the ferric ions ($Fe^{3+}$) and dodecylbenzene sulfonic acid ions ($DBS^-$) contained in the mixture solution had a molar ratio of at least 1:3.2. Then, a carbon paste layer 7 and a silver paste layer 8 were sequentially formed to complete a capacitor device. Thereafter, an anode lead frame (anode terminal) 10 was welded to the anode wire 1 of the capacitor device while a cathode lead frame (cathode terminal) 11 was connected to the capacitor device by conductive adhesive 9. Finally, the entire assembly was sealed with an epoxy resin 12 to thereby complete a chip capacitor.

EXAMPLE 2

A sintered pellet 2 formed with an oxide film 3, as in Example 1, was immersed in a mixture solution of 100 g of methanol solution containing 13% of pyrrole and 38% of ferric dodecylbenzene sulfonic acid and 2 g of toluene sulfonic acid. Ferric ions ($Fe^{3+}$) and toluene sulfonic acid ions ($TSA^-$) serving as an oxidizer and a dopant, respectively, had a molar ratio of 1:3.3 (toluene sulfonic acid was excessive with respect to a stoichiometric ratio of 1:3). Subsequently, the pellet 2 was left at room temperature for 30 minutes, immersed in a pyrrole solution, further left at room temperature for 30 minutes, rinsed with methanol for 15 minutes, and then dried at 150° C. for 30 minutes under reduced pressure to thereby form a polypyrrole layer. These steps were repeated 10 consecutive times in order to form a conducting polymer layer 4 formed of polypyrrole doped with toluene sulfonic acid. At this instant, toluene sulfonic acid was added such that the ferric ions ($Fe^{3+}$) and toluene sulfonic acid ions ($TSA^-$) contained in the mixture solution had a molar ratio of at least 1:3.2. This was followed by the same sequence of steps as in Example 1 so as to complete a chip capacitor.

EXAMPLE 3

A sintered pellet 2 formed with an oxide film 3, as in Example 1, was immersed in a mixture solution of 100 g of methanol solution containing 20% of pyrrole and 38% of ferric benzenedisulfonic acid and 4 g of benzenedisulfonic acid. Ferric ions ($Fe^{3+}$) and benzenedisulfonic acid ions ($BDS^-$) serving as an oxidizer and a dopant, respectively, had a molar ratio of 1:1.66 (benzenedisulfonic acid was excessive with respect to a stoichiometric ratio of 1:1.5). Subsequently, the pellet 2 was left at room temperature for 30 minutes, immersed in a pyrrole solution, further left at room temperature for 30 minutes, rinsed with methanol for 15 minutes, and then dried at 150° C. for 30 minutes under reduced pressure to thereby form a polypyrrole layer. These steps were repeated 10 consecutive times in order to form a conducting polymer layer 4 formed of polypyrrole doped with benzenedisulfonic acid. At this instant, benzenedisulfonic acid was added such that the ferric ions ($Fe^{3+}$) and benzenedisulfonic acid ions ($BDS^-$) contained in the mixture solution had a molar ratio of at least 1:1.6. This was followed by the same sequence of steps as in Example 1 so as to complete a chip capacitor.

EXAMPLE 4

A sintered pellet 2 formed with an oxide film 3, as in Example 1, was immersed in a mixture solution of 100 g of methanol solution containing 7% of pyrrole and 38% of cupric dodecylbenzene sulfonic acid and 4 g of dodecylbenzene sulfonic acid. Cupric ions ($Cu^{2+}$) and dodecylbenzene sulfonic acid ions ($DBS^-$) serving as an oxidizer and a dopant, respectively, had a molar ratio of 1:3.3 (dodecylbenzene sulfonic acid was excessive with respect to a stoichiometric ratio of 1:3). Subsequently, the pellet 2 was left at room temperature for 30 minutes, immersed in a pyrrole solution, further left at room temperature for 30 minutes, rinsed with methanol for 15 minutes, and then dried at 150° C. for 30 minutes under reduced pressure to thereby form a polypyrrole layer. These steps were repeated 10 consecutive times in order to form a conducting polymer layer 4 formed of polypyrrole doped with dodecylbenzene sulfonic acid. At this instant, dodecylbenzene sulfonic acid was added such that the cupric ions ($Cu^{2+}$) and dodecylbenzene sulfonic acid ions ($DBS^-$) contained in the mixture solution had a molar ratio of at least 1:3.2. This was followed by the same sequence of steps as in Example 1 so as to complete a chip capacitor.

EXAMPLE 5

A sintered pellet 2 formed with an oxide film 3, as in Example 1, was immersed in a mixture solution of 100 g of methanol solution containing 38% of ferric dodecylbenzene sulfonic acid and 4 g of dodecylbenzene sulfonic acid. Ferric ions ($Fe^{3+}$) and dodecylbenzene sulfonic acid ions ($DBS^-$) serving as an oxidizer and a dopant, respectively, had a molar ratio of 1:3.3 (dodecylbenzene sulfonic acid was excessive with respect to a stoichiometric ratio of 1:3). Subsequently, the pellet 2 was left at room temperature for 30 minutes, immersed in a pyrrole solution, further left at room temperature for 30 minutes, rinsed with methanol for 15 minutes, and then dried at 150° C. for 30 minutes under reduced pressure to thereby form a polypyrrole layer. These steps were repeated 10 consecutive times in order to form a conducting polymer layer 4 formed of polypyrrole doped with dodecylbenzene sulfonic acid. At this instant, dodecylbenzene sulfonic acid was added such that the ferric ions ($Fe^{3+}$) and dodecylbenzene sulfonic acid ions ($DBS^-$) contained in the mixture solution had a molar ratio of at least 1:3.2. This was followed by the same sequence of steps as in Example 1 so as to complete a chip capacitor.

EXAMPLE 6

4 g of dodecylbenzene sulfonic acid was added to 100 g of methanol solution containing 11% of 3,4-ethylenedioxythiophene and 38% of ferric dodecylbenzene sulfonic acid, and the mixture solution was cooled to −5° C. A sintered pellet 2 formed with an oxide film 3, as in Example 1, was immersed in the cooled mixture solution. Ferric ions ($Fe^{3+}$) and dodecylbenzene sulfonic acid ions ($DBS^-$) serving as an oxidizer and a dopant, respectively, had a molar ratio of 1:3.3 (dodecylbenzene sulfonic acid was excessive with respect to a stoichiometric ratio of 1:3). Subsequently, the pellet 2 was left at room temperature for 30 minutes, immersed in a 3,4-ethylenedioxythiophene solution, further left at room temperature for 90 minutes, rinsed with methanol for 15 minutes, and then dried at 150° C. for 30 minutes under reduced pressure to thereby form a poly(3,4-ethylenedioxythiophene) layer. These steps were repeated 10 consecutive times in order to form a conducting polymer layer 4 formed of poly(3,4-ethylenedioxythiophene) doped with dodecylbenzene sulfonic acid. At this instant, dodecylbenzene sulfonic acid was added such that the ferric ions ($Fe^{3+}$) and dodecylbenzene sulfonic acid ions ($DBS^-$) contained in the mixture solution had a molar ratio of at least 1:3.2. This was followed by the same sequence of steps as in Example 1 so as to complete a chip capacitor.

EXAMPLE 7

2 g of toluene sulfonic acid was added to 100 g of methanol solution containing 18% of 3,4-ethylenedioxythiophene and 38 % of ferric toluene sulfonic acid, and the mixture solution was cooled to −5° C. A sintered pellet 2 formed with an oxide film 3, as in Example 1, was immersed in the cooled mixture solution. The ferric ions ($Fe^{3+}$) and toluene sulfonic acid ions (TSA−) serving as an oxidizer and a dopant, respectively, had a molar ratio of 1:3.3 (toluene sulfonic acid was excessive with respect to a stoichiometric ratio of 1:3). Subsequently, the pellet 2 was left at room temperature for 90 minutes, immersed in a pyrrole solution, further left at room temperature for 90 minutes, rinsed with methanol for 15 minutes, and then dried at 150° C. for 30 minutes under reduced pressure to thereby form a poly(3,4-ethylenedioxythiophene) layer. These steps were repeated 10 consecutive times in order to form a conducting polymer layer 4 formed of poly(3,4-ethylenedioxythiophene) doped with toluene sulfonic acid. This was followed by the same sequence of steps as in Example 1 so as to complete a chip capacitor.

EXAMPLE 8

4 g of benzenedisulfonic acid was added to 100 g of methanol solution containing 26% of 3,4-ethylenedioxythiophene and 38% of ferric benzenedisulfonic acid, and the mixture solution was cooled to −5° C. A sintered pellet 2 formed with an oxide film 3, as in Example 1, was immersed in the cooled mixture solution. The ferric ions ($Fe^{3+}$) and benzenedisulfonic acid ions (BDS−) serving as an oxidizer and a dopant, respectively, had a molar ratio of 1:1.66 (benzenedisulfonic acid was excessive with respect to a stoichiometric ratio of 1:1.5). Subsequently, the pellet 2 was left at room temperature for 30 minutes, immersed in a 3,4-ethylenedioxythiophene solution, further left at room temperature for 90 minutes, rinsed with methanol for 15 minutes, and then dried at 150° C. for 30 minutes under reduced pressure to thereby form a poly(3,4-ethylenedioxythiophene) layer. These steps were repeated 10 consecutive limes in order to form a conducting polymer layer 4 formed of poly(3,4-ethylenedioxythiophene) doped with benzenedisulfonic acid. At this instant, benzenedisulfonic acid was added such that the ferric ions ($Fe^{3+}$) and benzenedisulfonic acid ions (BDS−) contained in the mixture solution had a molar ratio of at least 1:1.6. This was followed by the same sequence of steps as in Example 1 so as to complete a chip capacitor.

EXAMPLE 9

4 g of benzenedisulfonic acid was added to 100 g of methanol solution containing 10% of 3,4-ethylenedioxythiophene and 38% of cupric dodecylbenzene sulfonic acid, and the mixture solution was cooled to −5° C. A sintered pellet 2 formed with an oxide film 3, as in Example 1, was immersed in the cooled mixture solution. The cupric ions ($Cu^{2+}$) and dodecylbenzene sulfonic acid ions (DBS−) serving as an oxidizer and a dopant, respectively, had a molar ratio of 1:3.3 (dodecylbenzene sulfonic acid was excessive with respect to a stoichiometric ratio of 1:3). Subsequently, the pellet 2 was left at room temperature for 30 minutes, immersed in a 3,4-ethylenedioxythiophene solution, further left at room temperature for 90 minutes, then rinsed with methanol for 15 minutes, and then dried at 150° C. for 30 minutes under reduced pressure to thereby form a poly(3,4-ethylenedioxythiophene) layer. These steps were repeated 10 consecutive times in order to form a conducting polymer layer 4 formed of poly(3,4-ethylenedioxythiophene) doped with benzenedisulfonic acid. At this instant, dodecylbenzene sulfonic acid was added such that the cupric ions ($Cu^{2+}$) and dodecylbenzene sulfonic acid ions (DBS−) contained in the mixture solution had a molar ratio of at least 1:3.2. This was followed by the same sequence of steps as in Example 1 so as to complete a chip capacitor.

EXAMPLE 10

A sintered pellet 2 formed with an oxide film 3, as in Example 1, was immersed in a mixture solution of 100 g of methanol solution containing 38% of ferric toluene sulfonic acid and 2 g of toluene sulfonic acid. The ferric ions ($Fe^{3+}$) and toluene sulfonic acid ions (TSA−) serving as an oxidizer and a dopant, respectively, had a molar ratio of 1:3.3 (toluene sulfonic acid was excessive with respect to a stoichiometric ratio of 1:3). Subsequently, the pellet 2 was left at room temperature for 30 minutes, immersed in a 3,4-ethylenedioxythiophene solution, further left at room temperature for 30 minutes, rinsed with methanol for 15 minutes, and then dried at 150° C. for 30 minutes under reduced pressure to thereby form a poly(3,4-ethylenedioxythiophene) layer. These steps were repeated 10 consecutive times in order to form a conducting polymer layer 4 formed of poly(3,4-ethylenedioxythiophene) doped with toluene sulfonic acid. At this instant, toluene sulfonic acid was added such that the ferric ions ($Fe^{3+}$) and toluene sulfonic acid ions (TSA−) contained in the mixture solution had a molar ratio of at least 1:3.2. This was followed by the same sequence of steps as in Example 1 so as to complete a chip capacitor.

Comparative Example 1

A sintered pellet 2 was immersed in 100 g of methanol solution containing 7% of pyrrole and 38% of ferric dodecylbenzene sulfonic acid cooled to −70° C., as in Example 1. The ferric ions ($Fe^{3+}$) and dodecylbenzene sulfonic acid ions (DBS−) serving as an oxidizer and a dopant, respectively, had a molar ratio of 1:3. The pellet 2 was left at room temperature for 30 minutes, rinsed with methanol for 15 minutes, and then dried at 150° C. for 30 minutes in order to form a polypyrrole layer. These steps were repeated ten consecutive times in order to form a conducting polymer layer 4 formed of polypyrrole doped with dodecylbenzene sulfonic acid. This was followed by the same sequence of steps as in Example 1 so as to complete a chip capacitor.

Comparative Example 2

A sintered pellet 2 was immersed in 100 g of methanol solution containing 11% of 3,4-ethylenedioxythiophene and 38% of ferric dodecylbenzene sulfonic acid cooled to −5° C., as in Example 6. The ferric ions ($Fe^{3+}$) and dodecylbenzene sulfonic acid ions (DBS−) serving as an oxidizer and a dopant, respectively, had a molar ratio of 1:3. The pellet 2 was left at room temperature for 90 minutes, rinsed with methanol for 15 minutes, and then dried at 150° C. for 30 minutes in order to form a conducting polymer layer 4 formed of poly(3,4-ethylenedioxythiophene) doped with benzenedisulfonic acid. This was followed by the same sequence of steps as in Example 1 so as to complete a chip capacitor.

FIG. 3 lists ESRs measured with the capacitors of Examples 1–10 and Comparative Examples 1 and 2 at 100 kHz before and after 125° C. heat tests. As FIG. 3 indicates, the capacitors of Examples 1–10 are superior to the capacitors of Comparative Examples 1 and 2 as to heat resistance.

FIG. 4 lists ESRs and LCs measured with the capacitors of Examples 1–10 and the capacitors of Comparative Examples 1 and 2 before and after thermal shock tests conducted 100 consecutive times at −55° C. and +125° C. It will be seen that Examples 1–10 realize higher thermal shock resistance than Comparative Examples 1 and 2.

In summary, it will be seen that the present invention provides a solid electrolyte capacitor capable of preventing the conductivity of its conducting polymer from being deteriorated in a high temperature atmosphere, and thereby preventing an ESR from being lowered by a 125° C. heat test. This is because a conductive high polymer is doped with a dopant having a large molecule size. The capacitor of the present invention has another advantage that a conducting polymer layer having an extremely desirable film property is formed because the dopant in the layer has a uniformly high density. This successfully prevents stresses ascribable to the expansion and contraction of a seal resin from being transferred to the capacitor during a heat test, and thereby protects LC and EST from deterioration.

Various modifications will become possible for those skilled in the art after receiving the teachings of the present disclosure without departing from the scope thereof.

What is claimed is:

1. In a solid electrolyte capacitor including a solid electrolyte constituted by a conducting polymer produced by chemical oxidative polymerization of a polymerization system containing a monomer, a cation serving as an oxidizer, and an anion serving as a dopant, said polymerization system contains said anion in a stoichiometrically excessive amount relative to said cation.

2. A capacitor as claimed in claim 1, wherein said polymerization system contains said anion in an excessive amount by 2% to 20% relative to said cation.

3. A capacitor as claimed in claim 1, wherein said monomer comprises one of pyrrole, thiophene, furan, aniline and derivatives thereof.

4. A capacitor as claimed in claim 1, wherein said cation comprises one of ferric ions, cupric ions, and silver ions.

5. A capacitor as claimed in claim 1, wherein said anion comprises one of aromatic sulfonic acids, aromatic polysulfonic acids, organic sulfonic acids including a hydroxy group, organic sulfonic acids including a carboxyl group, alycyclic sulfonic acids, and benzoquinone sulfonic acids.

6. In a method of producing a solid electrolyte capacitor and including a step of forming, as a solid electrolyte, a conducting polymer layer on a dielectric layer present on a surface of an anode by chemical oxidative polymerization of a polymerization system containing a monomer, a cation serving as an oxidizer, and an anion serving as a dopant, said polymerization system contains said anion in a stoichiometrically excessive amount relative to said cation.

7. A method as claimed in claim 6, wherein said polymerization system contains said anion in an excessive amount by 2% to 20% relative to said cation.

8. A. capacitor as claimed in claim 6, wherein said monomer comprises one of pyrrole, thiophene, furan, aniline and derivatives thereof.

9. A capacitor as claimed in claim 6, wherein said cation comprises one of ferric ions, cupric ions, and silver ions.

10. A capacitor as claimed in claim 6, wherein said anion comprises one of aromatic sulfonic acids, aromatic polysulfonic acids, organic sulfonic acids including a hydroxy group, organic sulfonic acids including a carboxyl group, alycyclic sulfonic acids, and benzoquinone sulfonic acids.

11. A capacitor as claimed in claim 6, wherein said monomer, said cation and said anion are applied to said dielectric layer in a form of a mixture solution and subjected to chemical oxidative polymerization.

12. A capacitor as claimed in claim 6, wherein after said cation and said anion have been applied to said dielectric layer, said monomer is applied to said dielectric layer for chemical oxidative polymerization.

13. A capacitor as claimed in claim 6, wherein after said monomer has been applied to said dielectric layer, said cation and said anion are applied to said dielectric layer for chemical oxidative polymerization.

* * * * *